(12) United States Patent
Ross

(10) Patent No.: US 7,766,588 B2
(45) Date of Patent: Aug. 3, 2010

(54) CARGO HANDLING APPARATUS

(75) Inventor: Ralph Barclay Ross, Aberdeen (GB)

(73) Assignee: RB Ross Steel Fabrications, Ltd., Aberdeen, Scotland (GB)

( * ) Notice: Subject to any disclaimer, the term of this patent is extended or adjusted under 35 U.S.C. 154(b) by 0 days.

(21) Appl. No.: 11/220,993

(22) Filed: Sep. 7, 2005

(65) Prior Publication Data
US 2007/0053759 A1    Mar. 8, 2007

(51) Int. Cl.
*B60P 7/08* (2006.01)
(52) U.S. Cl. .............................. 410/40; 410/35; 410/36; 410/39; 410/87; 410/143; 410/155; 206/593
(58) Field of Classification Search .................. 410/32, 410/34–36, 38, 39, 42, 87, 117, 143, 150, 410/155; 206/443, 446, 593; 293/117, 120, 293/121; 211/59.4, 60.1, 70.4; 248/606, 248/68.1
See application file for complete search history.

(56) References Cited

U.S. PATENT DOCUMENTS

| | | | |
|---|---|---|---|
| 5,845,992 A * | 12/1998 | MacKelvie | |
| 6,119,861 A * | 9/2000 | Schneider | |
| 6,182,837 B1 | 2/2001 | Crabtree | |
| 6,261,037 B1 * | 7/2001 | Richards et al. | 410/36 |
| 6,599,069 B2 | 7/2003 | Ross | 410/36 |
| 6,799,926 B1 | 10/2004 | Ross | 410/36 |

* cited by examiner

*Primary Examiner*—Stephen Gordon
(74) *Attorney, Agent, or Firm*—Gifford, Krass, Sprinkle, Anderson & Citkowski, P.C.

(57) ABSTRACT

A retaining member 16 is provided for use with a frame 10 for packaging elongate members, such as sections of tubular, for example casing, liner or drill pipe. The retaining member 16 comprises a pressure plate 18 on which is mounted a pair of pivoting hooks 20 for engaging with protrusions 36 formed on the frame 10. The hooks 20 are connected to threaded rods 28 received in a sleeve 30. A ratcheted handle 34 allows selective rotation of the sleeve 30 to draw the rods 28 therein, and so to pivot the hooks 20 to urge the pressure plate 18 against members received within the frame 10. A quick release mechanism is provided to allow easy release of the hooks 20 and the retaining member 16.

18 Claims, 13 Drawing Sheets

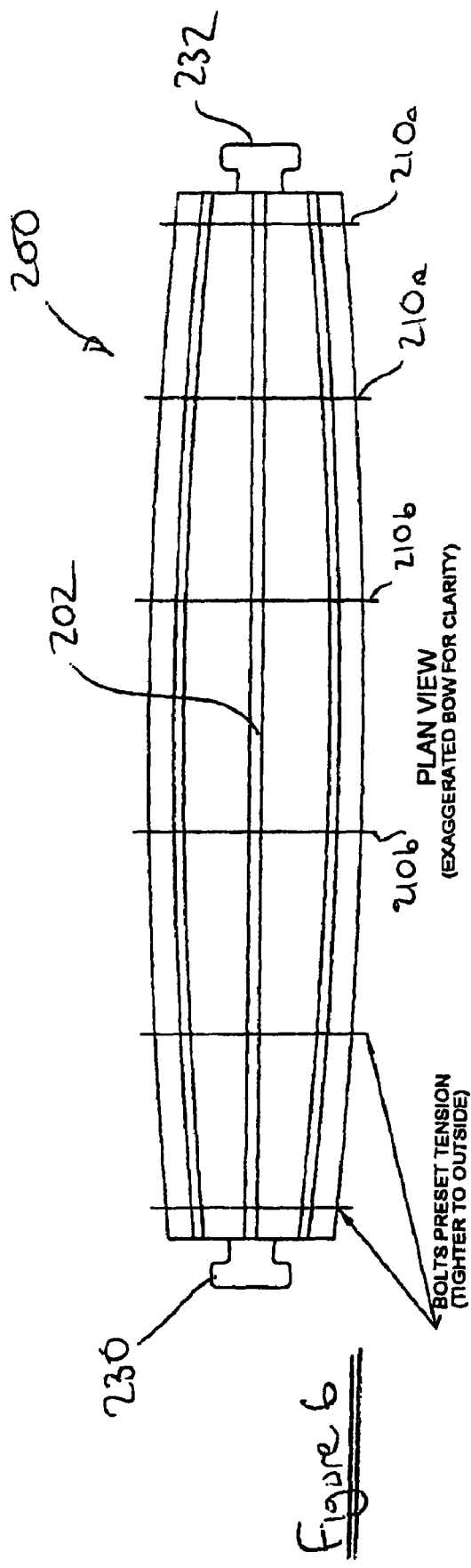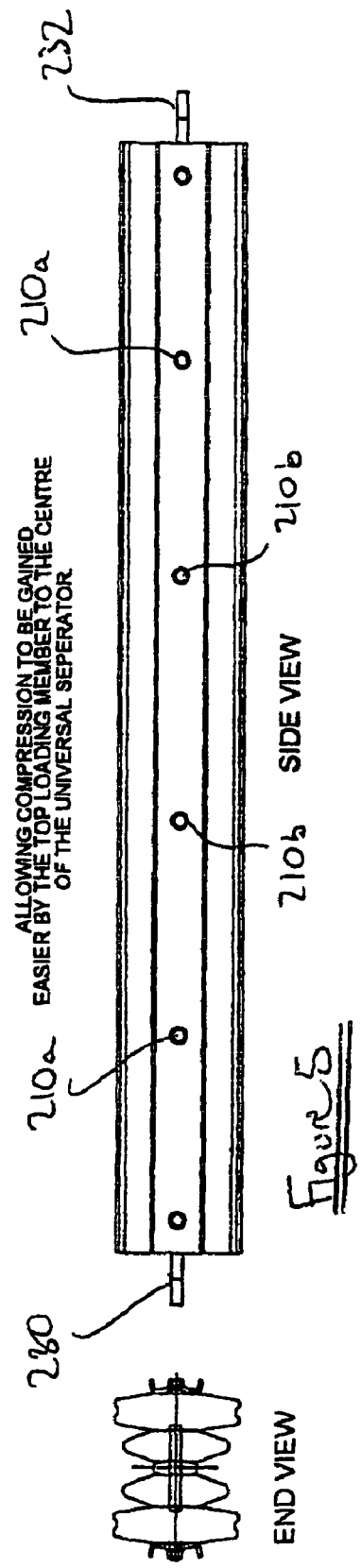

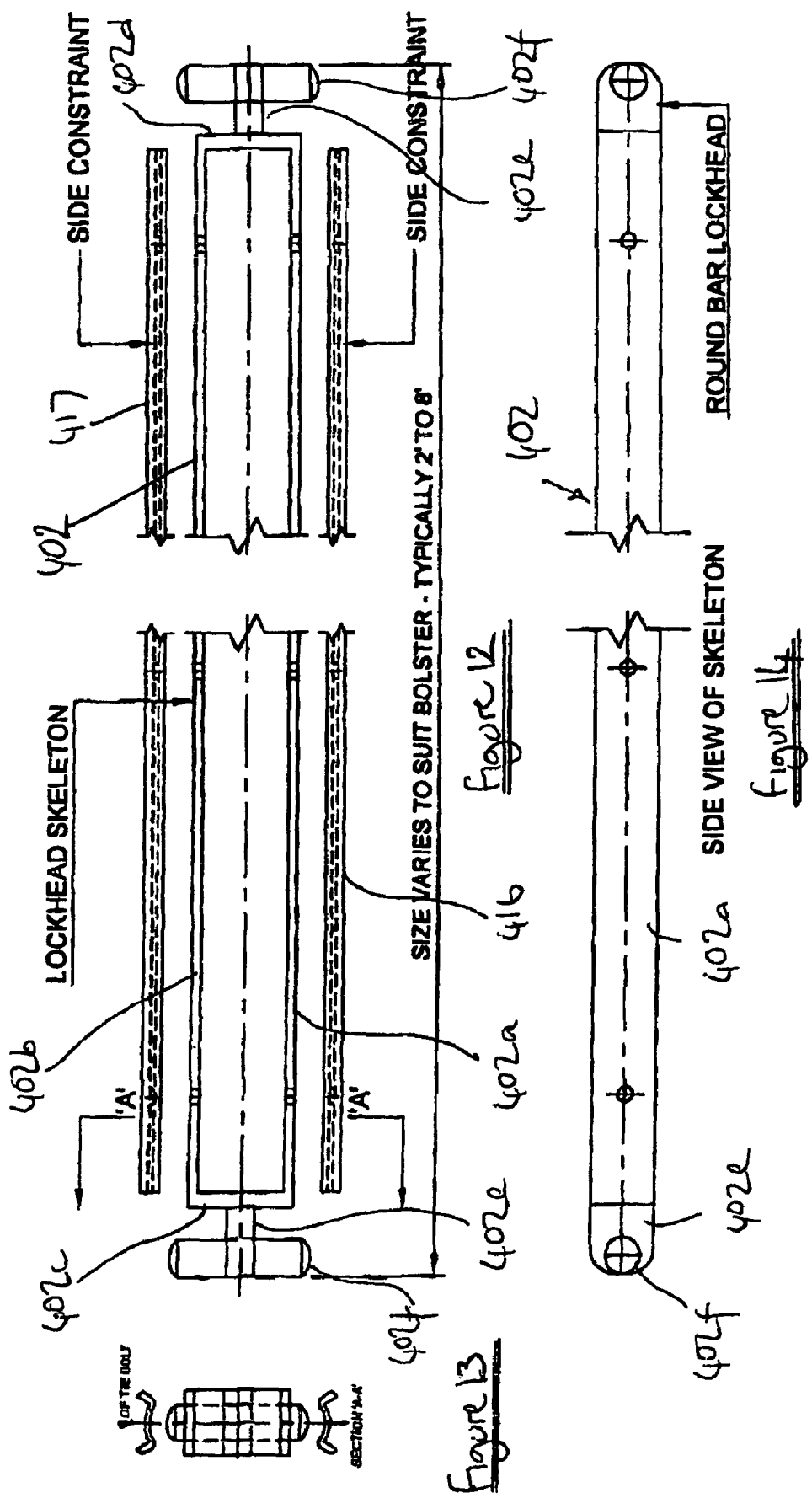

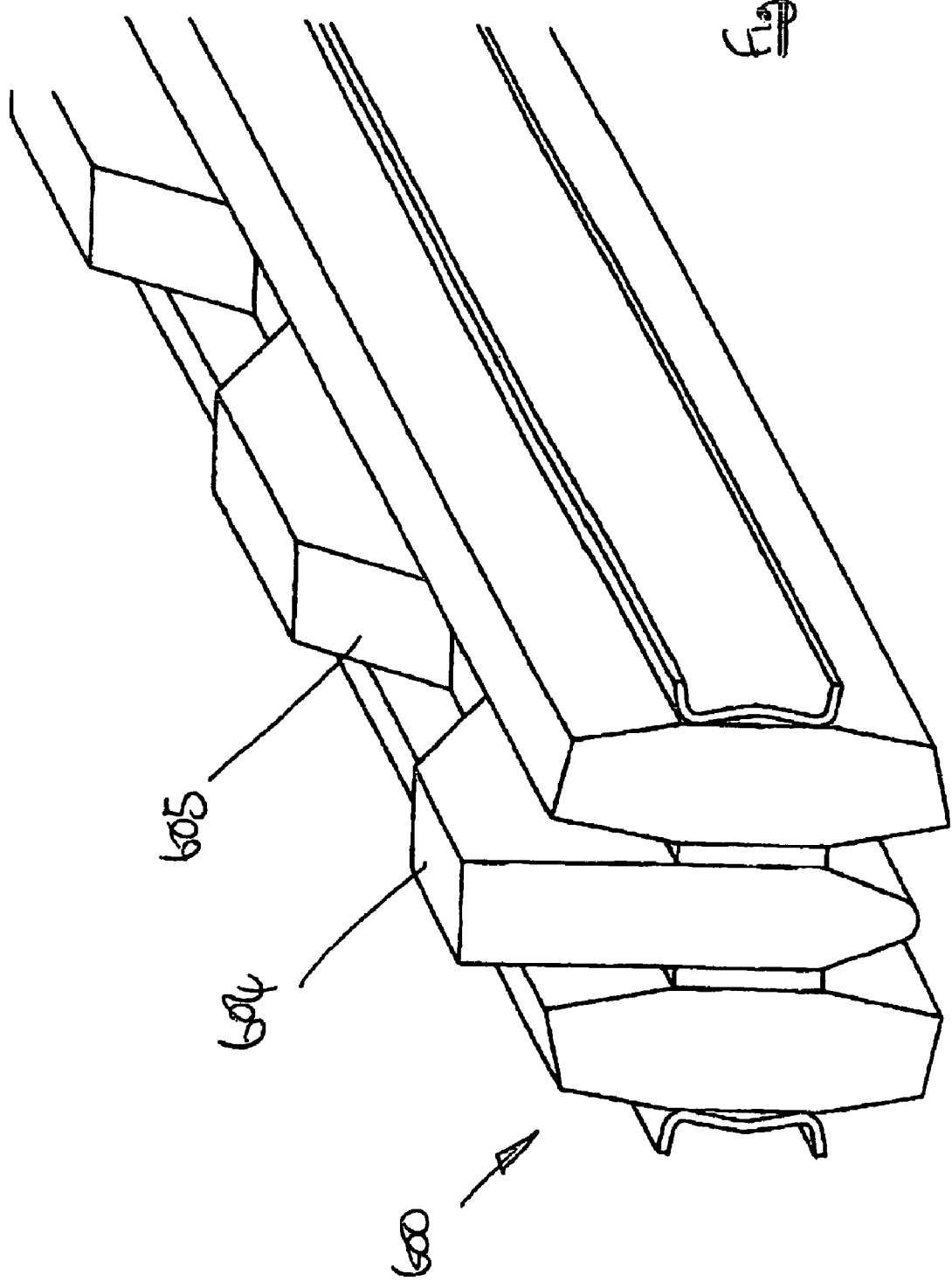

CARGO HANDLING APPARATUS

FIELD OF THE INVENTION

The present invention relates to cargo handling apparatus, particularly apparatus for packaging elongate members. Aspects of the invention further relate to a packing or cross member for use in such apparatus.

BACKGROUND OF THE INVENTION

Drilling boreholes by rotary drilling usually involves use of a drill string with a drill bit at the distal end, and a motor at the rig end. The drill string is conventionally made up of many drill pipe sections connected together by threaded box and pin connections. The drill pipe sections are typically 9.5-13.1 meters long, are relatively heavy, and require careful handling.

For storing and transporting drill pipe and other tubulars, such as casing and liner, it is known to stack tubular lengths in cuboid bundles. The bundles are formed using perhaps four U-frames, with spacers being located between the arms of the U-frames and having upper and lower faces profiled to co-operate with tubular lengths of a particular diameter. The U-frames are spaced along the bundle and the bundle is lifted by slings or the like coupled to the U-frames.

An improved drill pipe packaging apparatus has been developed, and is described in applicant's U.S. Pat. No. 6,799,926, the disclosure of which is incorporated herein by reference. This improved apparatus comprises a pair of connected U-frames, within which are located elastomer-coated packing members. In use, the tubulars to be packed are separated by the packing members, the elastomer coatings of which deform to grip the tubulars. In order to bring about secure engagement between the tubulars and packing members, the apparatus further comprises a retaining arrangement to urge the stack of tubulars and packing members together. Applicant's U.S. Pat. No. 6,599,069, the disclosure of which is incorporated herein by reference, discloses an improved retaining arrangement for such an apparatus.

SUMMARY OF THE INVENTION

According to a first aspect of the present invention, there is provided apparatus for packaging elongate members, the apparatus comprising: a frame comprising a base and side members; and at least one packing member engageable with the frame, the packing member comprising a plurality of deformable elements for engaging elongate members to be handled.

Other aspects of the invention relate to an improved packing member, and in particular a packing member comprising a plurality of deformable elements for engaging elongate members.

Providing a packing member with a plurality of deformable elements facilitates manufacture and maintenance of the packing member. The deformable elements will typically be moulded, and it is generally easier to mould items with a smaller cross-section. In the event of damage to a deformable element, only the damaged element need be replaced.

Preferably, the deformable elements are mountable to a frame member forming part of the packing member, which frame member preferably takes the form of a spine or skeleton. Separately forming the frame member and deformable elements facilitates manufacture of the packing member, and avoids the difficulties associated with cast moulding deformable material around a metal cross-member, as described in the packing member described in U.S. Pat. Nos. 6,182,837 and 6,799,926. The deformable elements may also be formed without having to take account of the possibility of cleaving of the deformable material from an integral metal cross-member. Furthermore, replacement of damaged parts of the packing member is possible, in contrast to the packing members of U.S. Pat. Nos. 6,182,837 and 6,799,926, in which any damage results in scrapping of the entire packing member.

Deformable elements may be manufactured in moulds of a particular dimension, for example length, and then cut down for use in shorter packing members. Alternatively, a member of elements may be arranged end-to-end for use in longer packing members.

Preferably, surfaces of the deformable elements extend both above and below the frame member, such that the deformable elements may engage elongate members in a frame that are both above and below the packing member.

The deformable elements may be formed of any appropriate deformable material, but are preferably of a resilient material, typically an elastomer, such as rubber, including recycled rubber, or an appropriate urethane. Rubber is preferred, having superior memory retention, and thus allowing better seating of elongate members. When used in the preferred application, this provides for more secure seating of pipe joints or tubulars and thus decreases roll factor and chaffing of tool joint shoulders on adjacent pipe joints. The superior memory retention of rubber elements is also useful in avoiding settling of elongate members on the deformable elements, particularly where the packing member is heavily loaded, for example at the bottom of a stack of pipe in a pipe handling frame.

The deformable elements may take any appropriate form, and are preferably elongate. The deformable elements may be of any appropriate cross-section, such as round or square, but most preferably have a greater height than width, and may have an oval, triangular, rectangular or lozenge-shaped or other polygonal cross-section. The preferred deformable element form has a reduced cross-section at or towards the elongate member-engaging surfaces thereof, to facilitate deformation of the surfaces and increase the extent of the surface area of the deformable element being biased into contact with the surface of the elongate member.

One or more deformable elements may feature different elongate member-engaging surfaces on upper and lower surfaces thereof. In one preferred embodiment a deformable element features elongate member-engaging areas on upper and lower surfaces of the deformable element arranged in a triangular pattern. On the packing member being compressed between layers of elongate members, the loads experienced by the deformable members are thus distributed in triangular fashion, which is believed to reduce transverse laddering, that is longitudinal movement of the upper surface of the packing member relative to the lower surface.

The elongate member-engaging surfaces of the deformable elements may take any appropriate form, and may be substantially smooth or may define grooves or other indentations or protrusions. The surfaces may be substantially uniform along the length of the elements, or may be stepped or define indentations, protrusions or other forms to facilitate location and retention of elongate members. Different forms of deformable elements may be provided in a single packing member. For example a single packing member may comprise a deformable element having a substantially uniform surface, or linearly extending surface, which deforms to accommodate and engage an elongate member loaded thereon over a relatively large area, and a deformable element having a surface defining elongate member receiving recesses, which serve to locate elongate members at predetermined locations on the packing member. The location of the elongate members in the recesses prevents lateral movement of the members loaded on the packing member, while the large active contact area provided by the non-recessed element, that is the area over which the element is biased into contact with the elongate member, is particularly effective in resisting longitudinal movement of elongate members. Alternatively, or in addition, a single packing member may comprise deformable elements of different dimensions or material properties. For example, by providing deformable elements of different hardness it is possible to provide a relatively easily deformable element that will undergo a relatively large degree of deformation in combination with a harder element that will undergo a relatively small degree of deformation. The Shore or Dura rating of the different elements may vary by 10-20%. In such a case, the deformable elements may have different initial dimensions or forms, to accommodate the different degrees of deformation. Such elements will provide different qualities of grip and support and it thus becomes possible to provide a packing member having predetermined properties by selection of appropriate deformable elements. A packing member having a mix of deformable elements may also better accommodate different degrees of loading, the provision of softer or more readily deformable elements ensuring that even relatively lightly loaded packing members will provide reasonable grip, and the provision of the harder or less readily deformed elements ensuring that a heavily loaded packing member will still provide the necessary support and will not suffer from too great a degree of deformation.

Preferably, each packing member comprises at least two deformable elements. In a preferred embodiment, three deformable elements are provided in a side-by-side arrangement, with a portion of the frame member between each of the elements.

The frame member may be of any appropriate material having the appropriate structural attributes, and will typically be of steel. The frame member may take any appropriate form, and will typically comprise one or more solid parts. Alternatively, or in addition parts of the frame member may have an I-section or box-section.

Preferably, the deformable elements are coupled to the frame member. The coupling may take any appropriate form, including bonding, adhesives, provision of appropriate inter-engaging parts or fixed or adjustable mechanical fasteners. It is preferred to utilise a plurality of adjustable mechanical fasteners, such as nuts and bolts, spaced along the length of the packing member. If desired, this permits portions of the deformable elements to be preloaded or restrained to different degrees. This is useful as it permits, for example, portions of deformable elements adjacent a central portion of a packing member to be restrained in a manner that permits deformation of the elements more readily than portions of the same deformable elements located towards the ends of the packing member. A similar effect could be achieved by other means, for example varying the material properties of the deformable elements along their length, or by the selective absence or presence of restraining members along the length of the packing member. However, the preferred arrangement of adjustable mechanical fasteners allows ready adjustment and use of deformable elements of consistent properties along their length, facilitating manufacture of the elements.

It is preferred that the deformable members are coupled to the frame member by releasable fasteners, as this facilitates replacement of damaged deformable elements.

The deformable elements may be formed by any appropriate process, and are preferably extruded or moulded.

The lateral cross-section of the deformable elements may be symmetrical about one or both of a horizontal and vertical axis. Alternatively, one or more of the elements may have an asymmetrical cross-section.

In one embodiment, the frame member comprises a skeleton within which a central deformable element is mounted. The skeleton may comprise elements which extend along either side of the central element. Side deformable elements may be mounted to the skeleton. Side constraints may be mounted to the outer sides of the deformable side elements to limit deformation thereof. In other embodiments the frame member may comprise a central spine member.

Ends of the frame member may be adapted to engage side members of the frame, and in a preferred embodiment the ends of the frame member include short lengths of round bar to engage with channels provided in the side members of the frame.

BRIEF DESCRIPTION OF THE DRAWINGS

These and other aspects of the present invention will now be described by way of example only with reference to the accompanying drawings, in which:

FIG. 5 is a side view of the packing member of FIG. 4;

FIG. 6 is a plan view of the packing member of FIG. 4;

FIGS. 12, 13 and 14 are plan, end and side views of a frame member of the packing member of FIG. 9; and FIGS. 15 and 16 are perspective sectional views of packing members in accordance with alternative embodiments of the present invention.

DETAILED DESCRIPTION OF THE INVENTION

Figure 1:
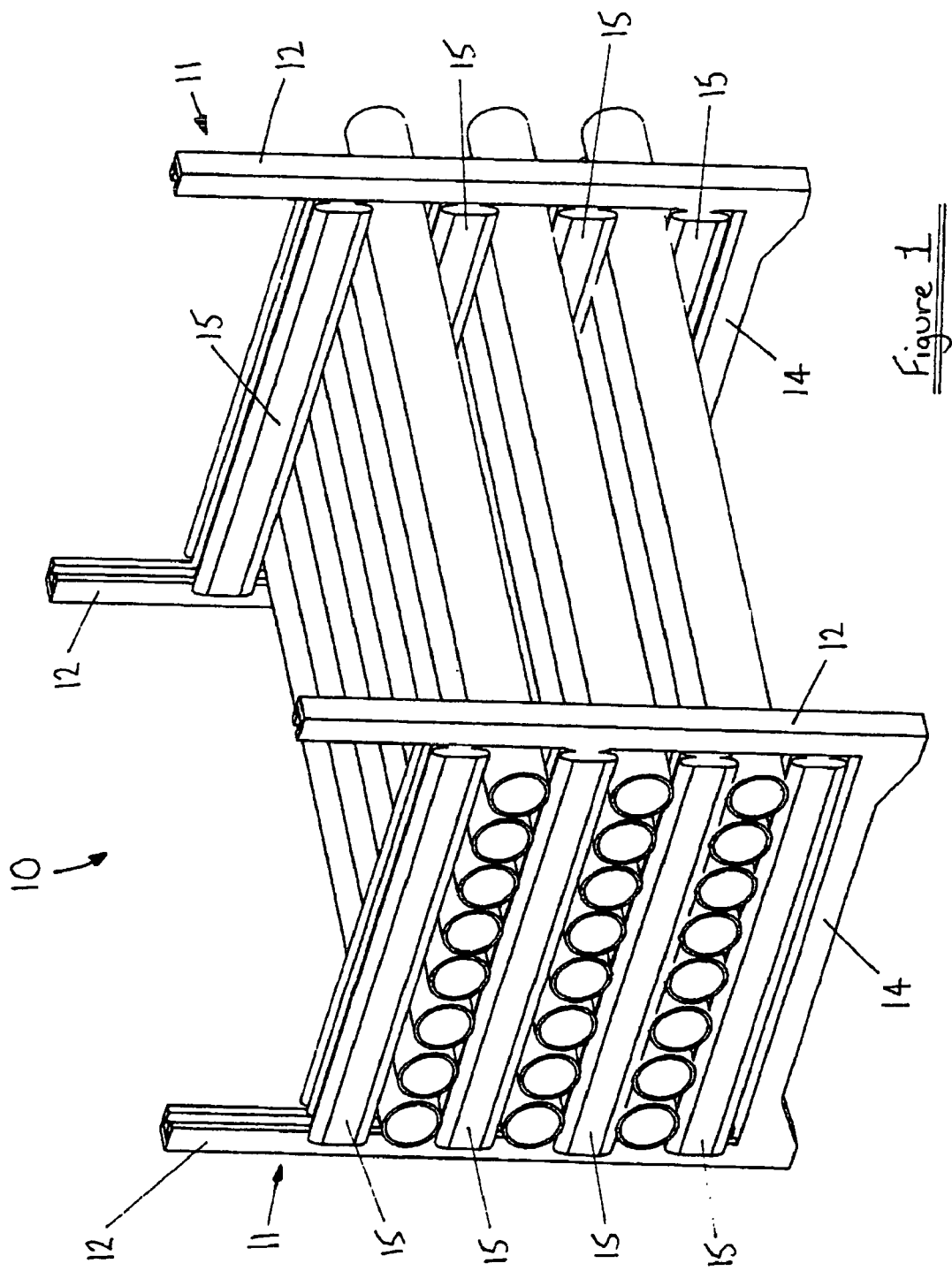
FIG. 1 shows a perspective view of an apparatus for packaging elongate members in accordance with one embodiment of a first aspect of the invention.

Referring first of all to FIG. 1, this shows a perspective view of an apparatus for packaging elongate members, in accordance with one embodiment of the invention. The apparatus 10 includes a pair of U-shaped frame members 11, each comprising two upright side portions 12 connected by an elongate base member 14. Each of the U-shaped frame members has a number of packing members 15 extending between the upright portions of the U-frame 12. In use, sections of drill pipe or other tubulars may be loaded onto the apparatus, with a packing member supporting either end of the tubulars. Elements of the packing members 15 deform under the weight of the tubulars, to hold the tubulars securely in position. A number of layers of tubulars may be built up, with elastomer on the lower portions of the packing members engaging the upper surfaces of the lower layers of tubulars. Once all layers of tubulars have been assembled, a retaining arrangement is tightened to urge the layers of tubulars and packing members together.

Figure 2:
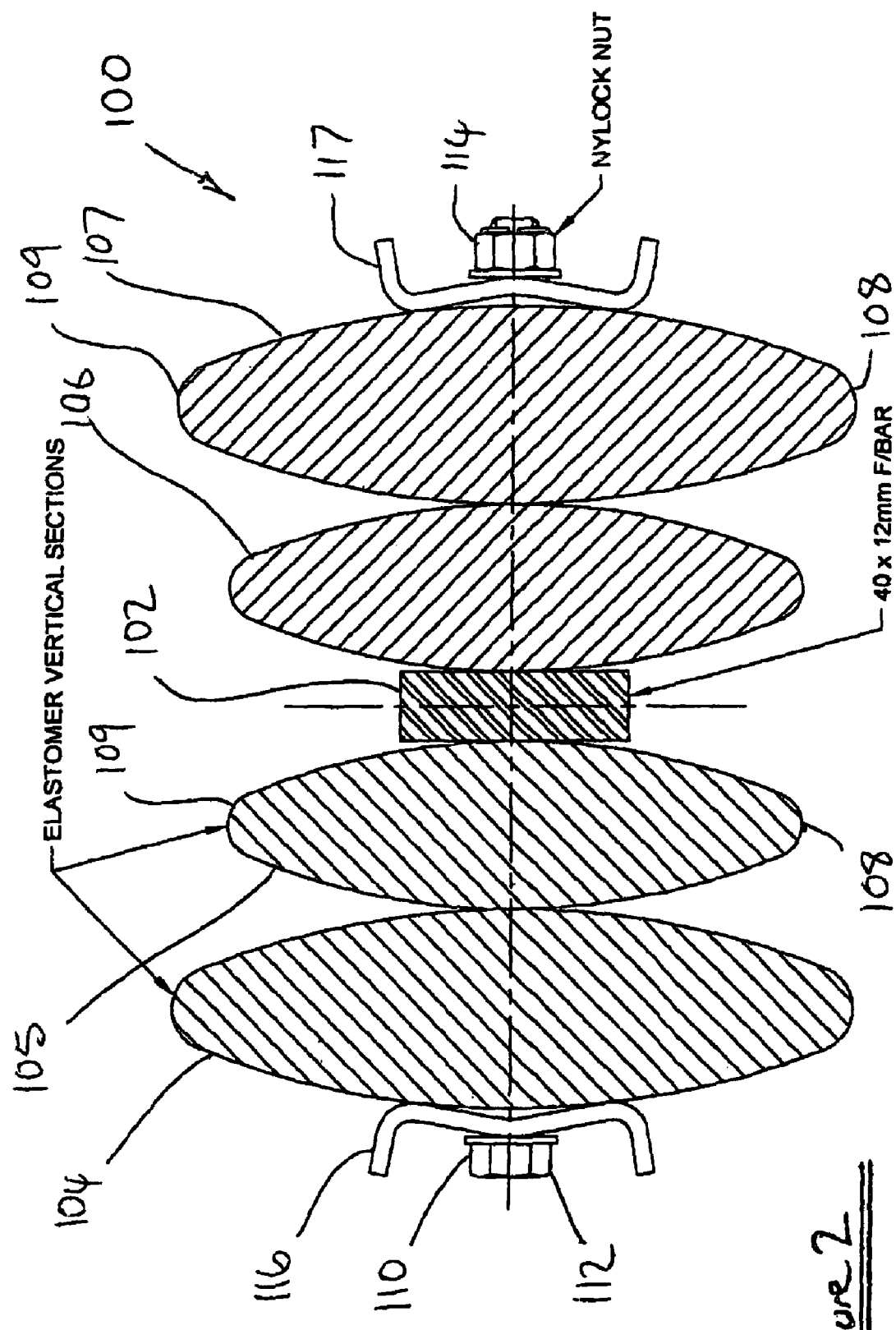
FIG. 2 is a sectional view of a packing member in accordance with an embodiment of a second aspect of the present invention.
Figure 3:
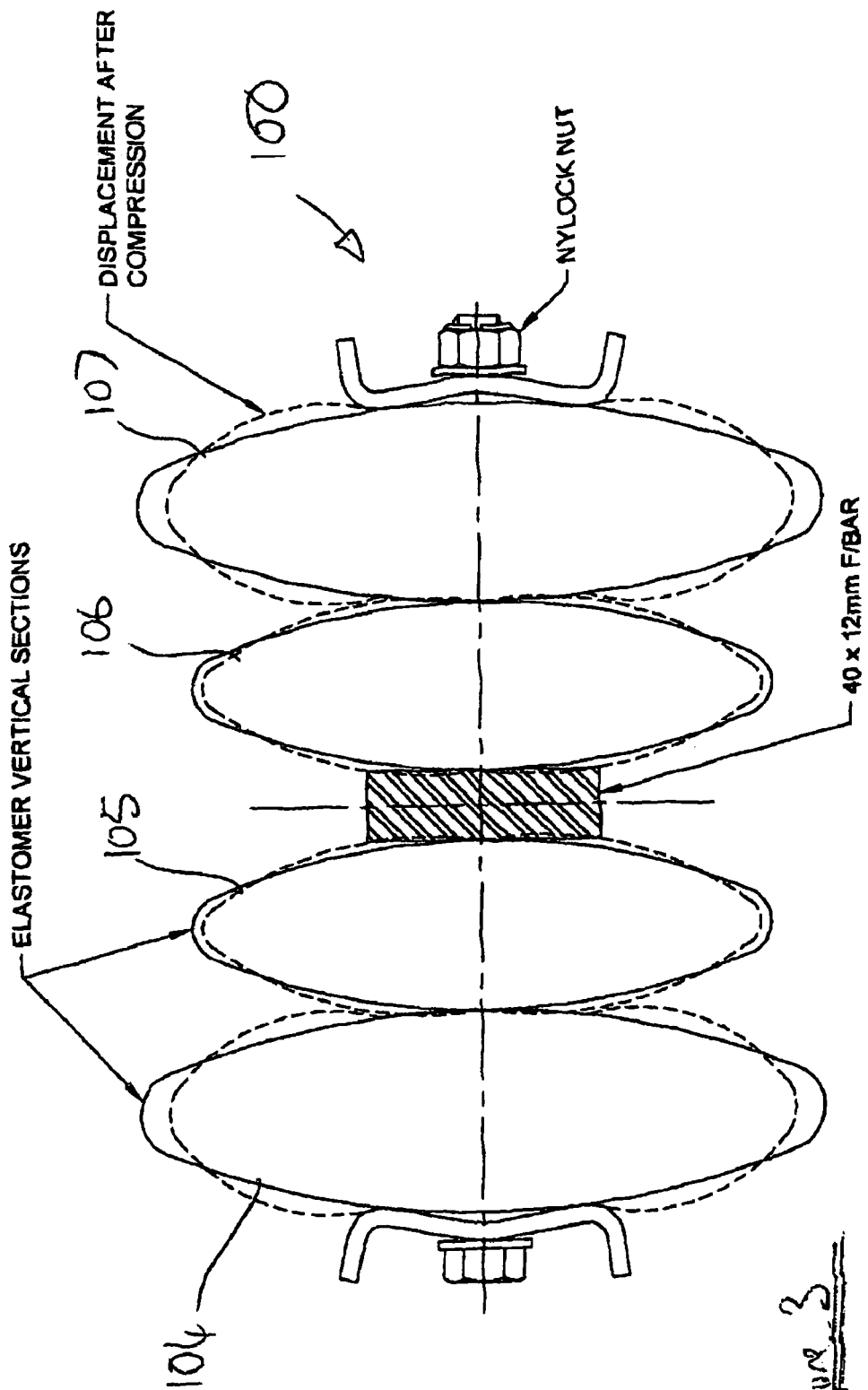
FIG. 3 is a sectional view of the packing member of FIG. 2, showing the behaviour of the packing member under load.

Reference will now be made to FIG. 2 of the drawings, which is a sectional view of a packing member 100 in accordance with another embodiment of the invention, and also to FIG. 3, which is a sectional view of the packing member of FIG. 2, showing the behaviour of the packing member 100 under load.

The packing member 100 comprises a frame member featuring a central spine 102 and four deformable members 104, 105, 106, 107 having lower and upper tubular-engaging surfaces 108, 109 for engaging and locating a row of tubulars located below the packing member 100 and for engaging, locating and supporting a row of tubulars located above the member 100.

The spine 102 is in the form of a solid steel bar and is located between the deformable members 104-107. The spine 102 and the deformable members 104-107 are coupled together by bolts 110, the bolt heads 112 and associated lock nuts 114 engaging constraining members in the form of steel channels 116, 117 mounted on the lateral faces of the outermost deformable members 104, 107.

The deformable members 104-107 are formed of oval urethane extrusions. In this embodiment the outermost members 104, 107 are taller and softer than the members 105, 106 directly adjacent the spine 102. Thus, in use, the outermost members 104, 107 will tend to experience a greater degree of deformation under load. This allows the packing member 100 to operate effectively and safely under a wide range of conditions. When the packing member 100 experiences relatively light loading the members 104, 107 will deform to grip the tubulars and limit or prevent relative movement of the tubulars across the member 100. In this situation the harder members 105, 106 may experience relatively little deformation. Under heavy loading, the degree of deformation of the softer members 104, 107 will be limited by the harder members 105, 106, which thus protect the softer member 104, 107, while also providing an additional degree of support and grip for the tubulars.

Figure 4:
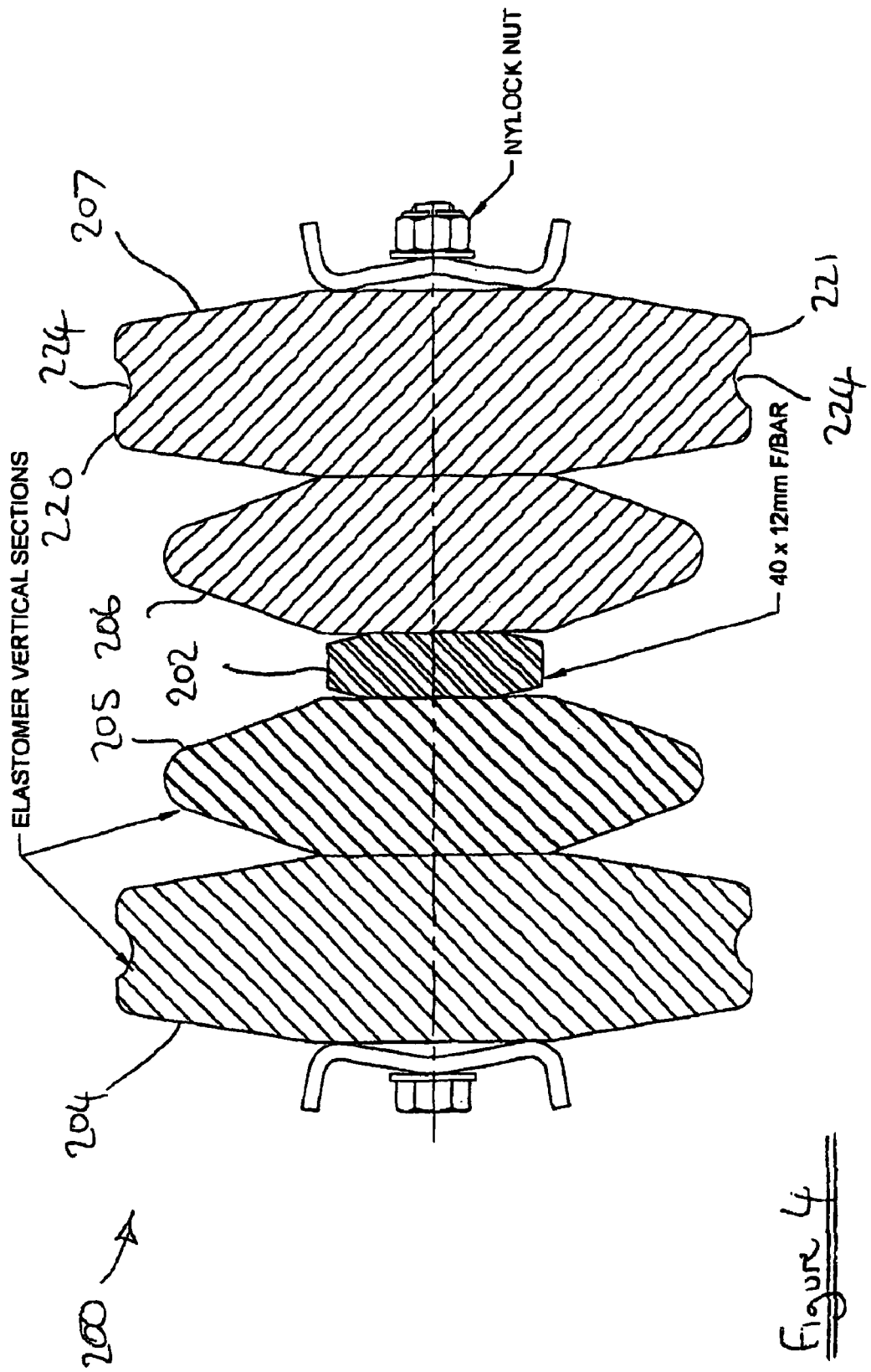
FIG. 4 is a sectional view of a packing member in accordance with a further embodiment of the second aspect of the invention.

Reference is now made to FIGS. 4 to 6 of the drawings, which illustrate a packing member 200 in accordance with a further embodiment of the invention. The packing member 200 is generally similar to the packing member 100 described above, but features deformable members 204, 205, 206, 207 of somewhat different cross-section. In particular, the softer (Shore A 60) outermost members 204, 207 are generally lozenge-shaped and the bearing faces 220, 221 each define a groove 224. The harder (Shore A 85) inner members 205, 206 also have central portions with straighter sides, to assist in creating a more stable packing member 200, but retain rounded upper and lower portions.

FIGS. 5 and 6 also illustrate the T-shaped pieces 230, 232 provided at the ends of the spine 202 for engaging with corresponding undercut channels in the uprights of the U-frame 12.

FIG. 6 is a plan view of the packing member 200 and illustrates, in exaggerated form, an effect that may be achieved by selectively tightening the bolts 210 which couple the members 204-207 to the spine 202. In particular, the bolts 210*a* towards the ends of the packing member 200 are tightened to a greater extent than the bolts 210*b* towards the centre of the member 200. This tends to provide the member 204-207 with a degree of pre-loading or compression, such that the end portions of the members 204-207 resist vertical compression and deformation to a greater degree than the central portion of the members 204-207. This facilitates gripping of the tubulars by the members 204-207, as the loading experienced by the packing member 200 has been found not to be constant across the U-frame. In particular, it has been found that the loading experienced by the central portions of packing members 200 between the middle layers of tubulars in a U-frame is relatively low, and it is otherwise difficult to provide sufficient loading and grip in these areas without overloading other portions of the packing members 200. Thus, by configuring selected packing members 200 such that the deformable members 204-207 are more easily deformed in a central portion of the member 200, it is possible to provide a member 200 which will provide substantially consistent grip and support across its length, even when the loading experienced by the member 200 is not consistent.

Figure 7:
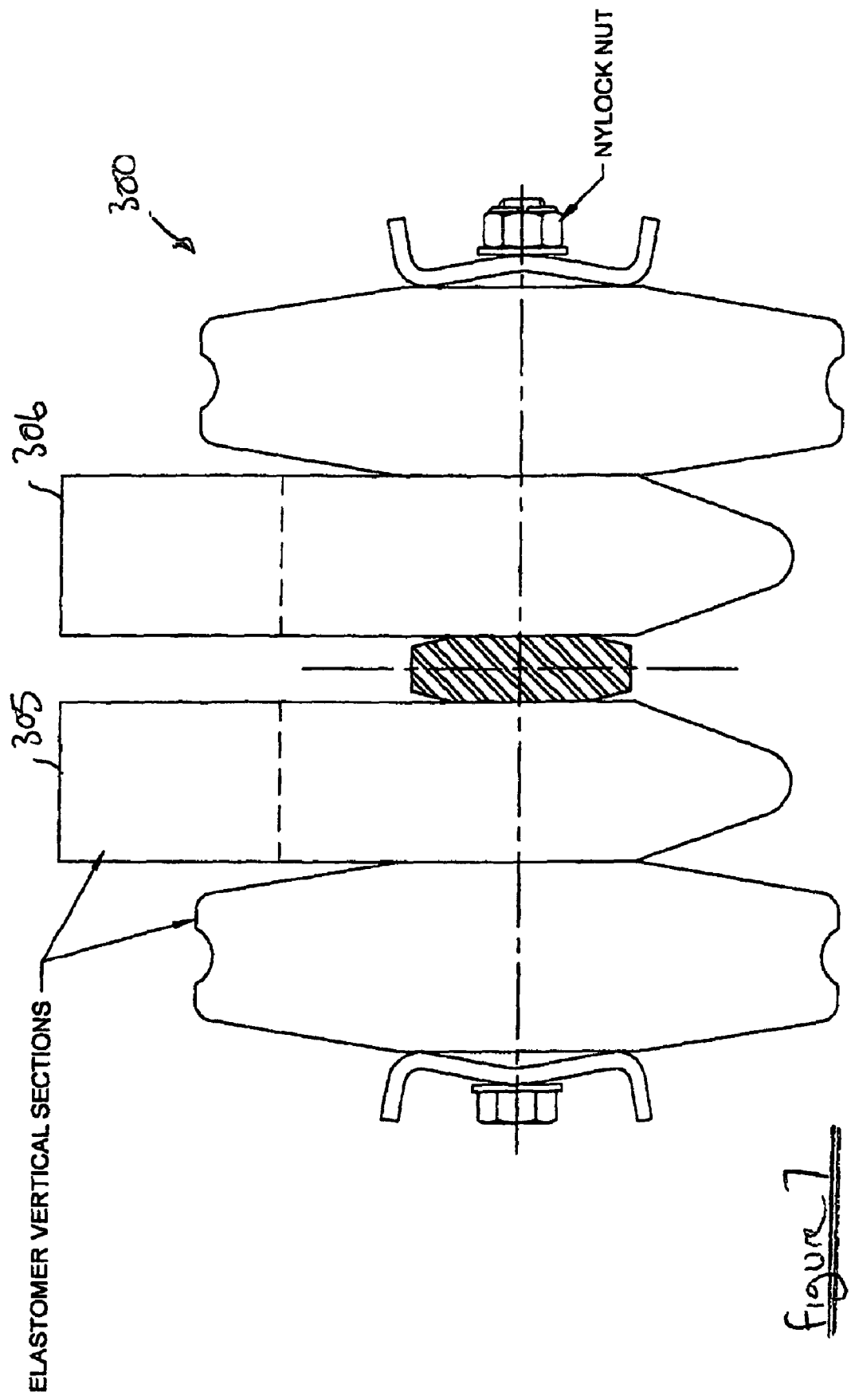
FIG. 7 is a sectional view of a packing member in accordance with a still further embodiment of the second aspect of the invention.
Figure 8:
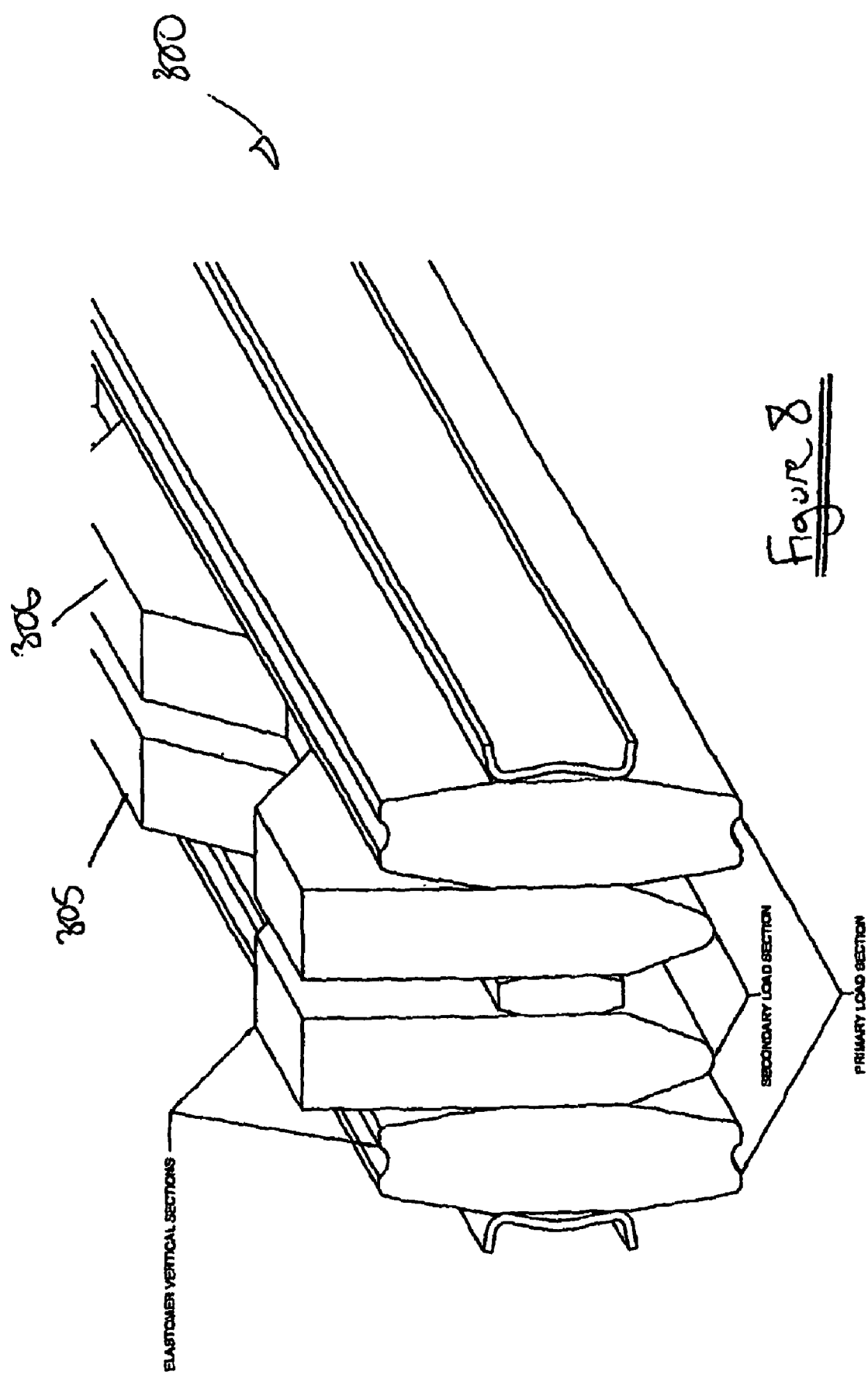
FIG. 8 is a perspective view of the packing member of FIG. 7.
Figure 9:
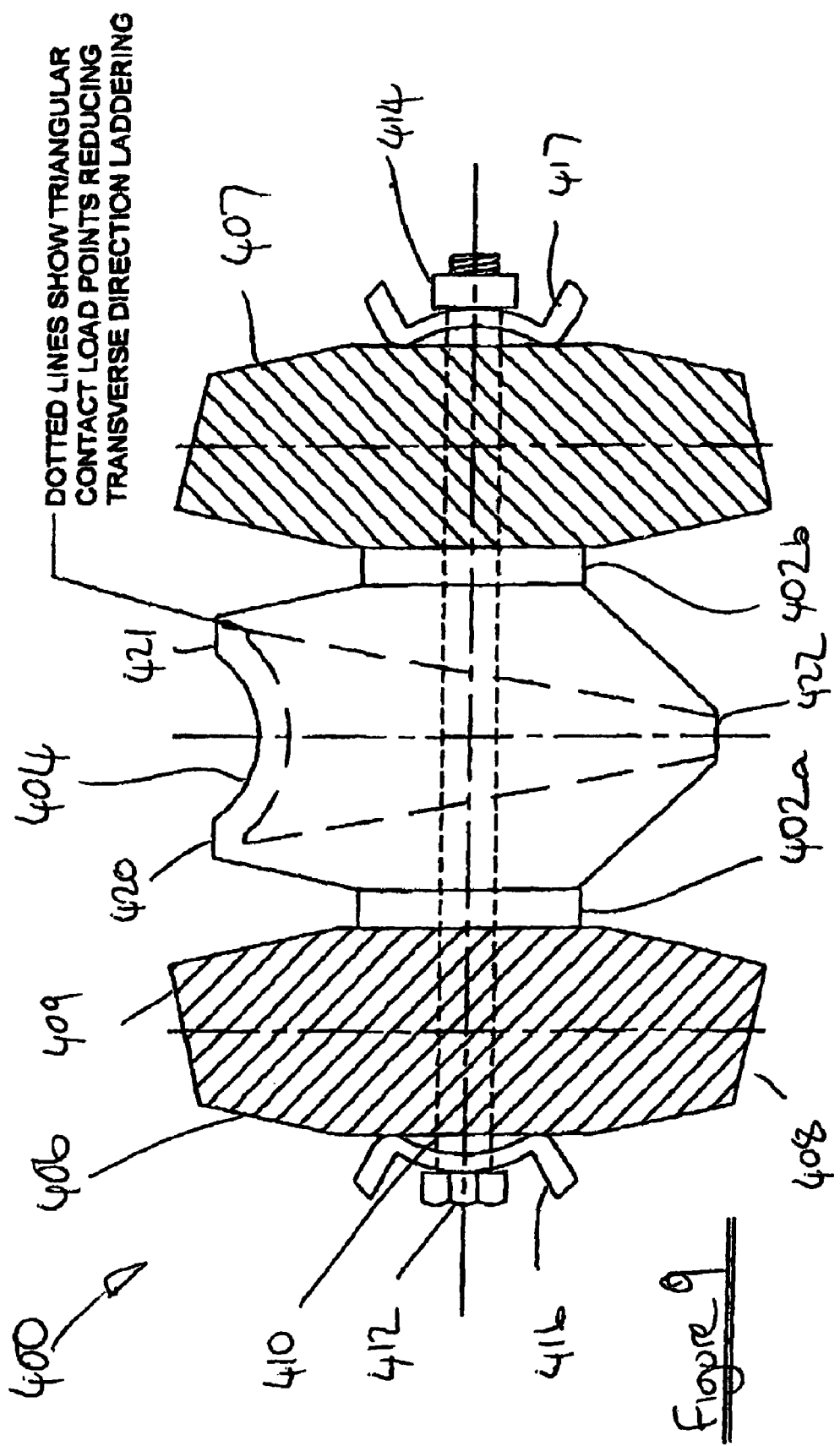
FIGS. 9 and 10 are sectional views of a packing member in accordance with a preferred embodiment of the present invention.
Figure 10:
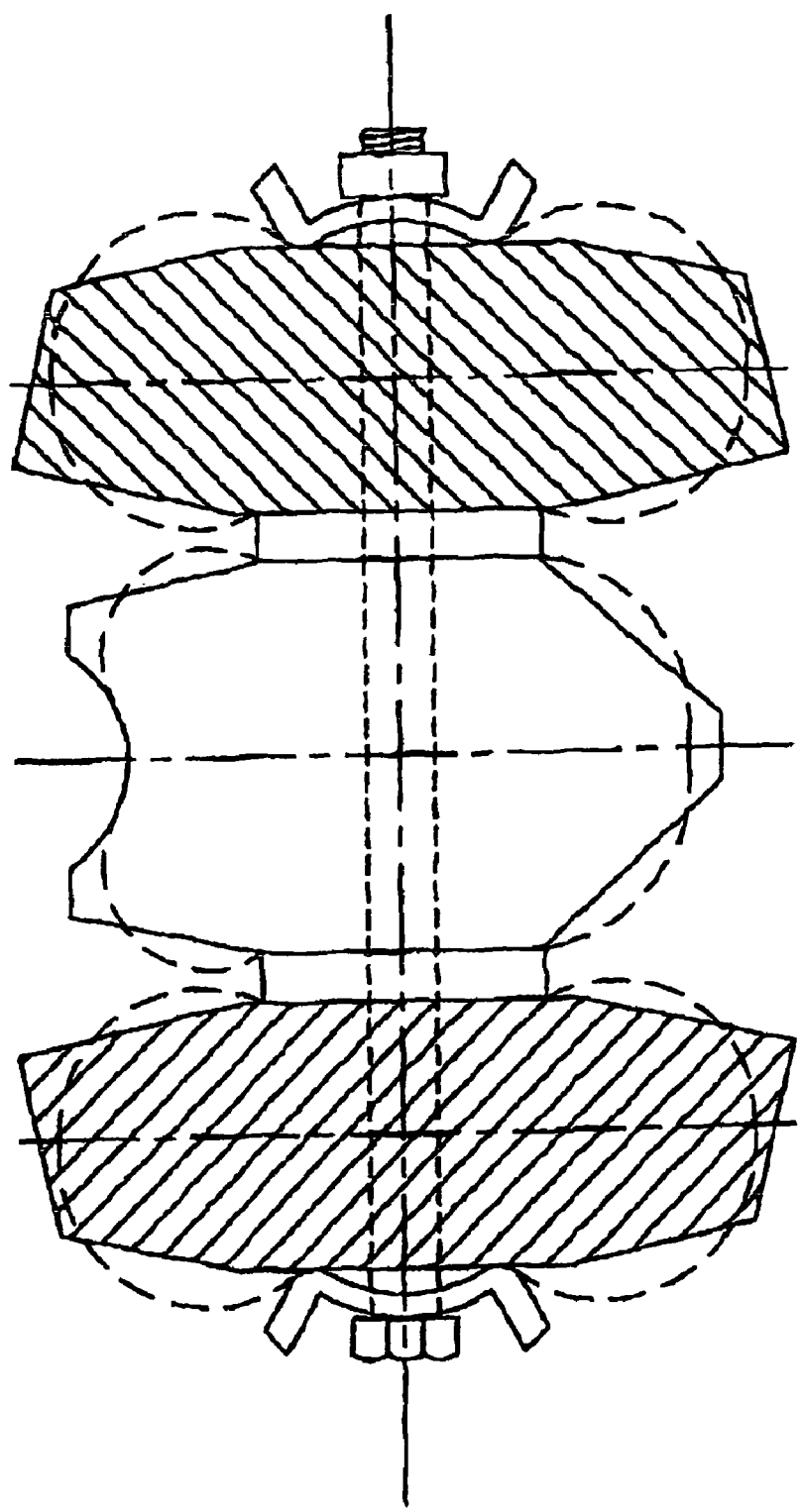
Figure 11:
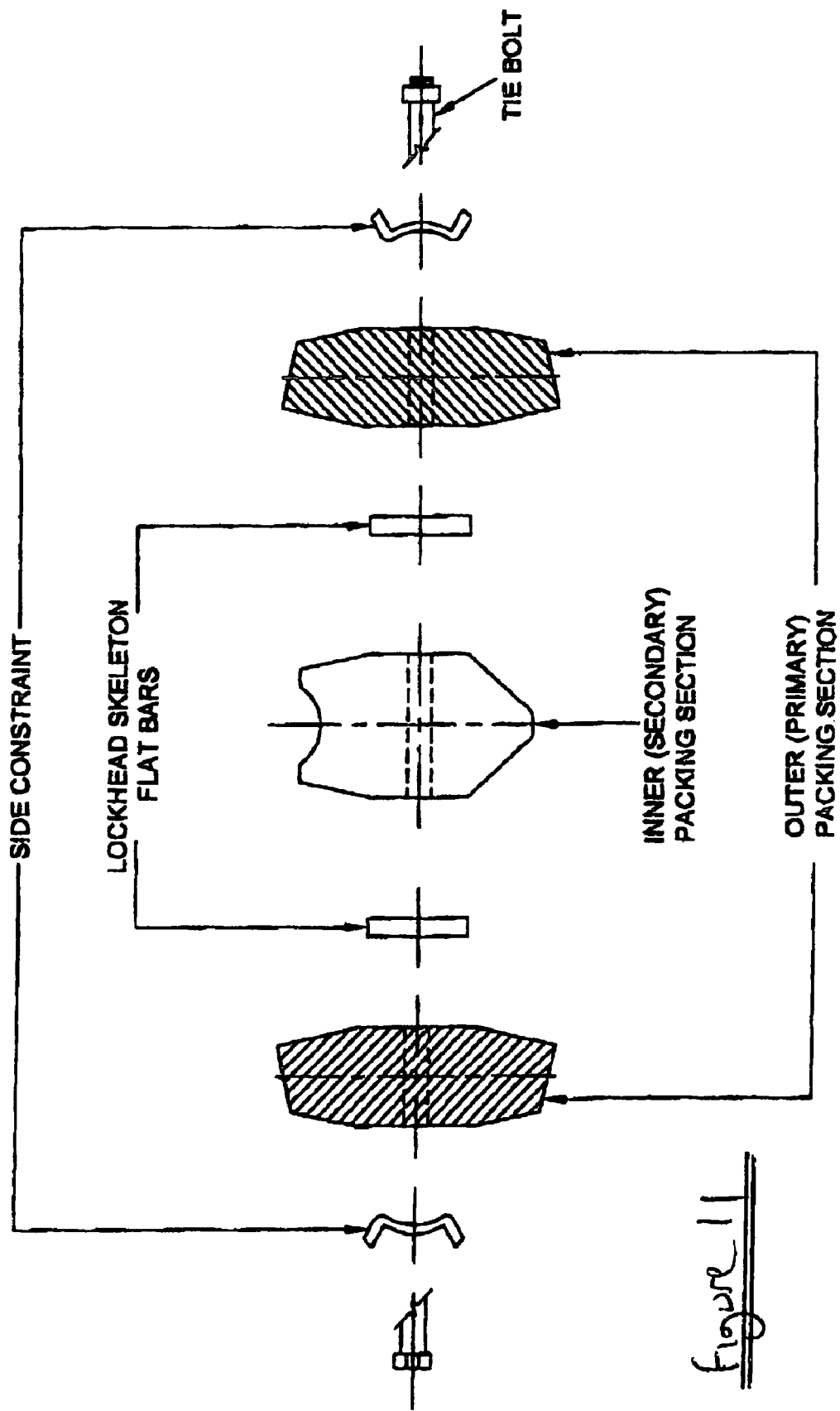
FIG. 11 is an exploded sectional view of the packing member of FIG. 9.

Reference is now made to FIGS. 7 and 8 of the drawings, which illustrate a packing member 300 in accordance with a still further embodiment of the invention. The packing member 300 is similar to the member 200 described above, however the upper surface of the inner pair of deformable members 305, 306 is shaped to define recesses to positively locate and space tubulars across the upper surface of the member 300. This is useful where it is desired to ensure that there is no contact between adjacent tubulars in a layer.

Reference is now made to FIGS. 9 to 14 of the drawings, which illustrate features of a packing member 400 in accordance with a preferred embodiment of the present invention.

The packing member 400 comprises a frame member including a skeleton 402, and three deformable elements 404, 406, 407 having lower and upper tubular-engaging surfaces 408, 409.

The skeleton 402 comprises two spine members 402*a*, 402*b* joined by two short cross-members 402*c*, 402*d*. An end piece 402*e* extends from each cross-member 402*c*, 402*d* and provides mounting for a round bar lockhead 402*f* for co-operating with side portions 12 of the U-frame 11.

The skeleton 402 receives the central deformable element 404, and the outer deformable elements 406, 407 are mounted to respective spine members 402*a*, 402*b*. The various parts are fixed together by bolts 410, the bolt heads 412 and associated lock nuts 414 engaging side constraints 416, 417 mounted on the lateral faces of the outermost deformable elements 406, 407.

The deformable elements 404, 406, 407 are formed of pressure moulded rubber, and in particular a blend of virgin and recycled rubber. The elements are themselves recyclable.

The central element 404 has an upper face defining two spaced-apart contact surfaces 420, 421 and a single central lower contact surface 422. Thus, when compressed between two layers of pipes or tubulars the element 404 tends to experience triangular loading, which it is believed will tend to reduce transverse direction laddering, that is a tendency for the packing members 400 to deform under load by an upper contact surface moving longitudinally relative to a lower contact surface.

The outer deformable elements 406, 407 are generally lozenge-shaped, but have inclined contact faces such that an inner raised edge of each face makes initial contact with the pipe or elongate member. The outer elements 406, 407 extend above and below the central element 404 and thus provide the primary contact with the pipes or tubulars, while the central elements 404, which may be formed of a harder rubber compound, provides the secondary contact.

Figure 15:
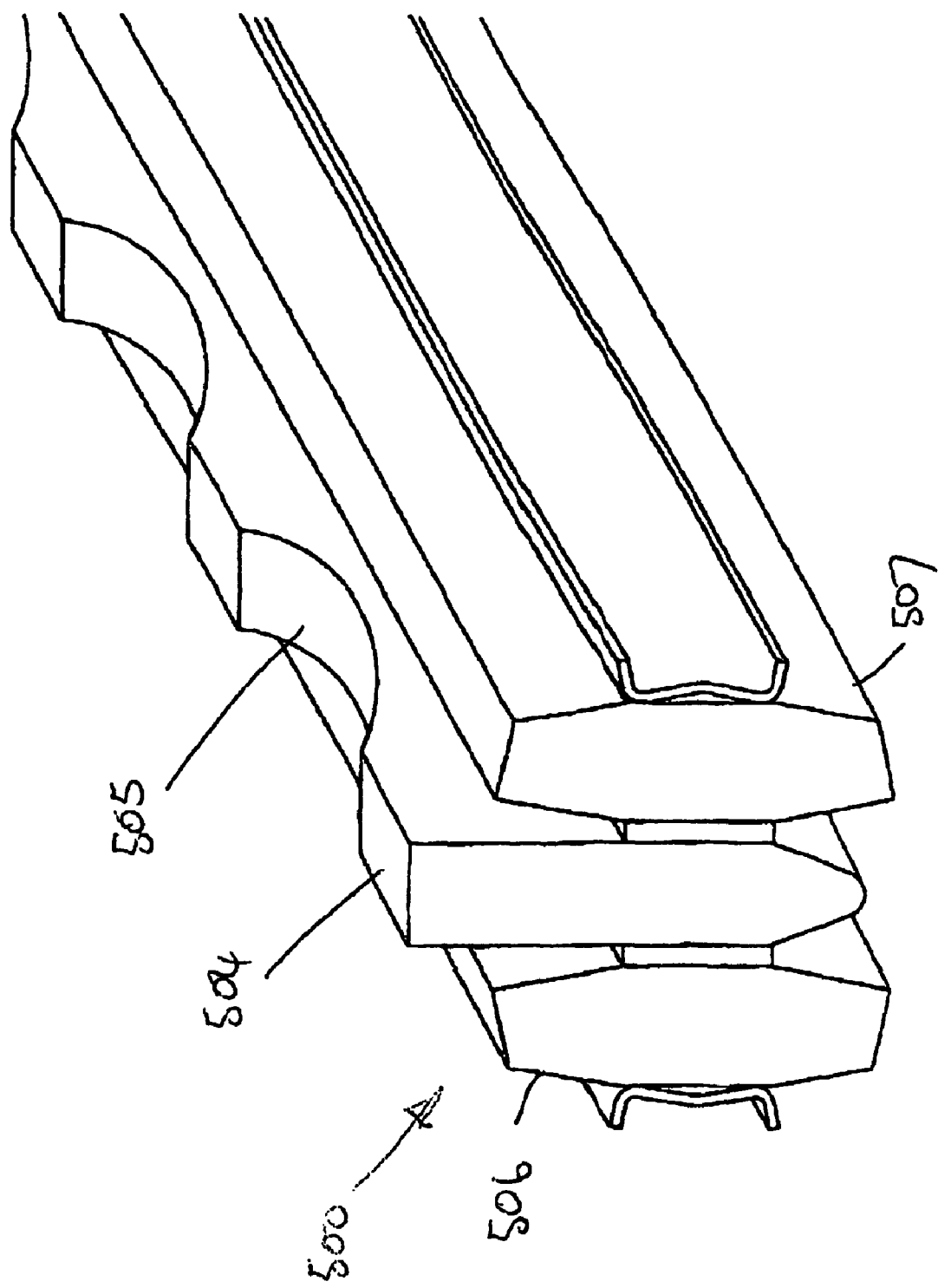

The deformable elements may have a constant cross-section or may define pipe-receiving recesses, as evident in the embodiments illustrated in FIG. 15 and 16 of the drawings. In these embodiments the respective central elements 504, 604 each feature pipe-receiving recesses 505, 605. The recesses 505, 605 ensure that there is little or no lateral movement of pipes relative the packing members 500, 600, but fix the maximum number of pipes that may be carried in a frame provided with such members 500, 600. In contrast to conventional profiled packing members, packing members 500, 600 made in accordance with these embodiments of the present invention may safely secure a range of pipe sizes. For example, a pipe having a smaller external diameter than the recesses 505 will still be gripped and held over a relatively large area by the outer deformable elements 506, 507, which extend above the lowest point of each recess 505. Also, only the upper face of each element features recesses 505, such that each pipe will experience a relatively large area contact with the central element 504 above the pipe.

It will be clear to those of skill in the art that the above-described embodiments of the invention are merely exemplary of the invention, and that various modifications and improvements may be made thereto without departing from the scope of the invention.

The invention claimed is:

1. A packing member providing locating support between individual layers of crosswise extending elongated members, said packing member comprising:
    an elongate skeleton upon which is supported a central element and a pair of outer elements arranged on either side of said central element;
    said central element having an upper face defining a pair of spaced apart contact surfaces and a lower face defining a single central contact surface; and
    said outer elements each further having upper and lower inclined contact faces, each contact face exhibiting an inner raised edge which, upon making initial contact with selected upper and lower positioned one of said elongate members, causes deformation of said outer elements;
    the elongate members subsequently promoting a triangular loading deformation of said central element by engaging said pair of contact surfaces of said upper face and said single contact surface of said lower face, thereby preventing transverse directed laddering deformation.

2. The packing member of claim 1, further comprising a frame member including at least one elongated and rectilinear frame element, and wherein the central and outer elements are mounted to the frame member and extend parallel to the at least one frame element.

3. The packing member of claim 1, wherein at least one of the central and outer elements includes an upper elongate member-engaging surface for engaging an upper layer of parallel elongate members and a lower elongate member-engaging surface for engaging a lower layer of parallel elongate members.

4. The packing member of claim 1, wherein at least one of the central and outer elements has an aspect ratio less than one.

5. The packing member of claim 1, wherein at least one of said central and outer elements comprises an upper portion, an intermediate portion and a lower portion, and the upper and lower portions are of reduced cross-section relative to the intermediate portion.

6. The packing member of claim 1, wherein at least one of said central and outer elements is at least one of generally oval, rectangular, lozenge-shaped and triangular in cross-section.

7. The packing member of claim 1, wherein at least one of said central and outer elements defines a member-engaging surface which is substantially uniform along a length of said at least one deformable element.

8. The packing member of claim 1, wherein said outer elements have first material properties and said central element has different second material properties.

9. The packing member of claim 8, wherein said outer elements have a first hardness and said central element has a different second hardness.

10. The packing member of claim 9, wherein said first hardness is lower than said second hardness and said outer elements have a greater vertical extent than said central element.

11. The packing member of claim 1, further comprising an elongated and rectilinear spine member, one of said central and outer elements being mounted on one side of and parallel to the spine member, and another one of said central and outer elements being mounted on an opposite side of and parallel to the spine member.

12. The packing member of claim 1, said elongate skeleton further comprising a frame member, and wherein said central and outer elements are coupled to said frame member.

13. The packing member of claim 12 wherein said central and outer elements are coupled to the frame member by mechanical fasteners.

14. The packing member of claim 12, wherein the central and outer elements are coupled to a frame member by releasable fasteners.

15. The packing member of claim 1, wherein at least one of the central and outer elements comprises rubber.

16. The packing member of claim 1, wherein at least one of the central and outer elements is a moulding.

17. The packing member of claim 1, further comprising a frame member having end portions adapted for engaging with side members of a U-frame.

18. The packing member as described in claim 1, said skeleton further comprising a pair of spine members joined by a pair of cross members.

* * * * *